(12) United States Patent
Lachance et al.

(10) Patent No.: US 9,783,119 B1
(45) Date of Patent: Oct. 10, 2017

(54) ADJUSTABLE LADDER RACK

(71) Applicant: Techno-Fab 9000 Inc., Saint-Hyacinthe (CA)

(72) Inventors: Yan Lachance, Saint-Simon-de-Bagot (CA); Guillaume Audet, Shefford (CA); Sebastien Donais, Saint-Hyacinthe (CA)

(73) Assignee: Techno-Fab 9000 Inc., Saint-Hyacinthe (CA)

( * ) Notice: Subject to any disclaimer, the term of this patent is extended or adjusted under 35 U.S.C. 154(b) by 0 days.

(21) Appl. No.: 15/457,467

(22) Filed: Mar. 13, 2017

Related U.S. Application Data

(60) Provisional application No. 62/308,545, filed on Mar. 15, 2016.

(51) Int. Cl.
  *B60R 9/02* (2006.01)
  *B60R 9/04* (2006.01)
  *B60R 9/048* (2006.01)
  *B60R 9/042* (2006.01)
  *B60R 9/06* (2006.01)

(52) U.S. Cl.
  CPC .......... *B60R 9/0423* (2013.01); *B60R 9/0485* (2013.01); *B60R 9/06* (2013.01); *B60R 9/02* (2013.01); *B60R 9/04* (2013.01); *B60R 9/048* (2013.01)

(58) Field of Classification Search
  CPC .. B60R 9/02; B60R 9/04; B60R 9/048; B60R 9/0485; B60R 9/0423; B60P 3/40
  USPC .............................. 224/324, 570; 248/316.4
  See application file for complete search history.

(56) References Cited

U.S. PATENT DOCUMENTS

| | | | | |
|---|---|---|---|---|
| 2,134,823 A | * | 11/1938 | Stephan | B60R 9/02 24/72.5 |
| 3,251,519 A | * | 5/1966 | Jones | B60R 9/0485 224/323 |
| 4,413,801 A | * | 11/1983 | Lancaster | B60R 9/0423 224/405 |
| 4,813,585 A | * | 3/1989 | Nutt | B60R 9/0485 182/127 |
| 6,315,181 B1 | | 11/2001 | Bradley et al. | |

(Continued)

FOREIGN PATENT DOCUMENTS

| | | | | |
|---|---|---|---|---|
| FR | 2449000 A1 | * | 9/1980 | ........... B60R 9/0423 |
| GB | 2281755 A | * | 3/1995 | ............. B60R 9/048 |

OTHER PUBLICATIONS

European Search Report of 17160431.7 filed Mar. 10, 2017; Berlin; Jun. 27, 2017; Schaeffler, C.

*Primary Examiner* — Justin Larson
(74) *Attorney, Agent, or Firm* — Benoit & Cote Inc.

(57) ABSTRACT

The present invention relates to a ladder rack for holding a ladder, the ladder rack comprising an arm extending longitudinally from a proximal end to a distal end; a slidable member which is slidably mounted on the arm; a first clamp fixed to the arm; a second clamp fixed to the slidable member at a distance from the first clamp; a handle pivotally connected to the distal end of the arm; a pivoting member pivotally connected on one end to the handle and on another end to the slidable member; whereby upon pivoting the handle upwardly, the pivoting member is forced to pivot at both ends thereof and to push on the slidable member, which translates toward the proximal end, reducing the distance between the first clamp and the second clamp.

4 Claims, 14 Drawing Sheets

(56) References Cited

U.S. PATENT DOCUMENTS

| | | | |
|---|---|---|---|
| 9,481,313 B2 * | 11/2016 | Levi | B60R 9/0485 |
| 2005/0079036 A1 | 4/2005 | Richter | |
| 2009/0140021 A1 | 6/2009 | Richter et al. | |

* cited by examiner

ADJUSTABLE LADDER RACK

CROSS-REFERENCE TO RELATED APPLICATIONS

This application claims benefit or priority of U.S. Provisional application No. 62/308,545 filed Mar. 15, 2016, the specification of which is hereby incorporated herein by reference in its entirety.

BACKGROUND

Field

The subject matter disclosed generally relates to ladder racks. More specifically, it relates to clamps for holding a ladder.

Related Prior Art

There exist rack systems for holding ladders and other similar equipment on the side of vehicles.

Existing side ladder racks for vehicles usually clamp ladders from the outside, inwardly. The width of the clamps is usually not adjustable, which means that it can be difficult to change the type of ladder being clamped. Moreover, the clamps are often rotatable; this movement can weaken the clamping by creating imperfections in the clamping and therefore gaps which cause the ladder not to be secured well. This difficulty implies that the ladder further needs to be strapped, which is inconvenient.

Moreover, prior art rack systems often involve two arms of a different length, since the width of the ladder to be clamped can change along the height of the ladder.

SUMMARY

According to an aspect of the invention, there is provided a ladder rack for holding a ladder. The ladder rack comprises an arm extending longitudinally from a proximal end to a distal end and a slidable member which is slidably mounted on the arm. A first clamp is fixed to the arm and a second clamp is fixed to the slidable member at a distance from the first clamp. A handle is pivotally connected to the distal end of the arm. There is further provided a pivoting member pivotally connected on one end to the handle and on another end to the slidable member, whereby upon pivoting the handle upwardly, the pivoting member is forced to pivot and both ends thereof and to push on the slidable member, which translates toward the proximal end, reducing the distance between the first clamp and the second clamp.

According to an embodiment, the first clamp and the second clamp are adapted to clamp the ladder from inward outwardly.

According to an embodiment, the ladder rack is provided as a pair of identical ladder racks for holding the ladder.

According to an embodiment, the ladder rack is for installation on one of: an outer side of a vehicle, an inner side of the vehicle, an inner rear of the vehicle, an outer rear of the vehicle, and an inner roof of a vehicle.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
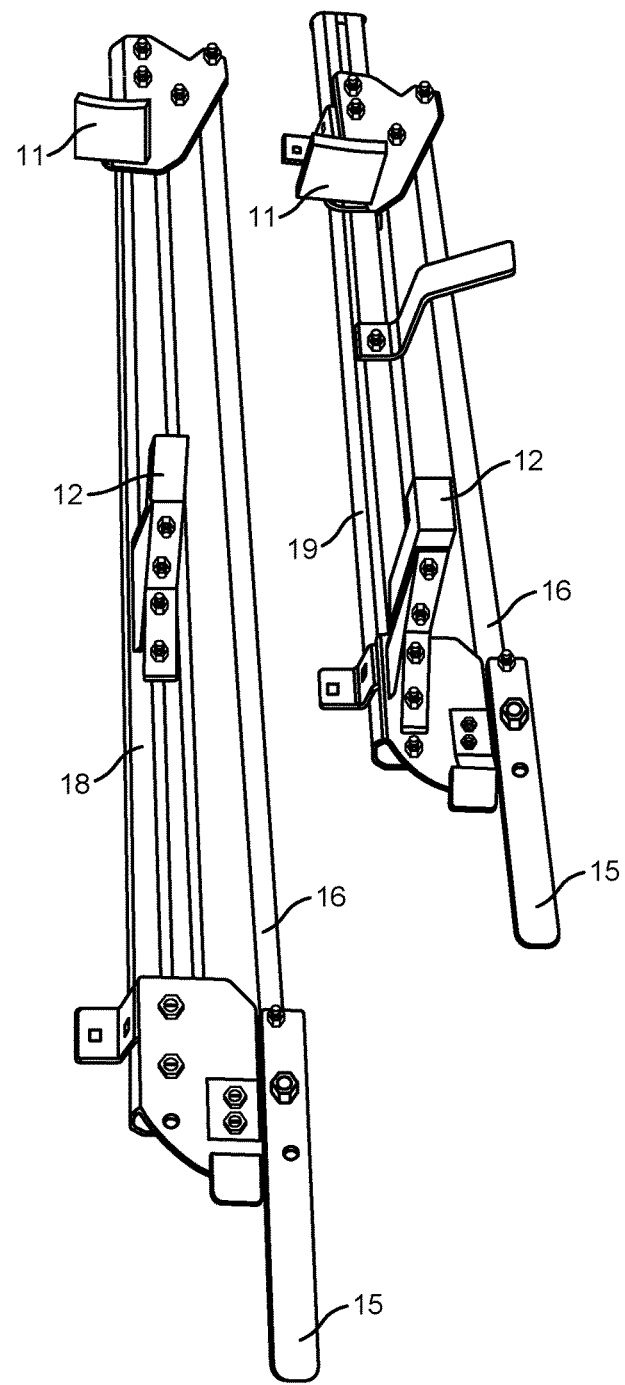
FIG. 1 is a picture illustrating a side ladder rack in a locked position, according to the prior art.
Figure 2:
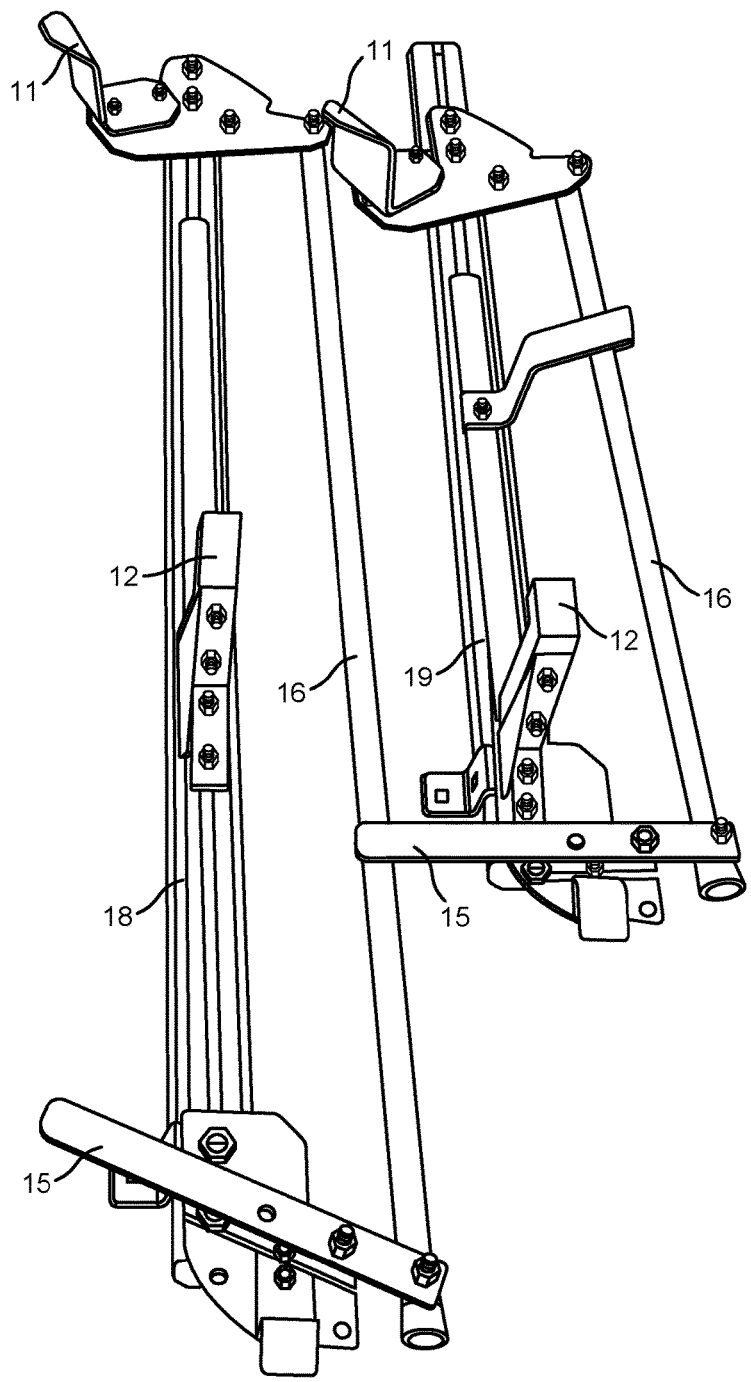
FIG. 2 is a picture illustrating a side ladder rack in an unlocked position, according to the prior art.
Figure 3:
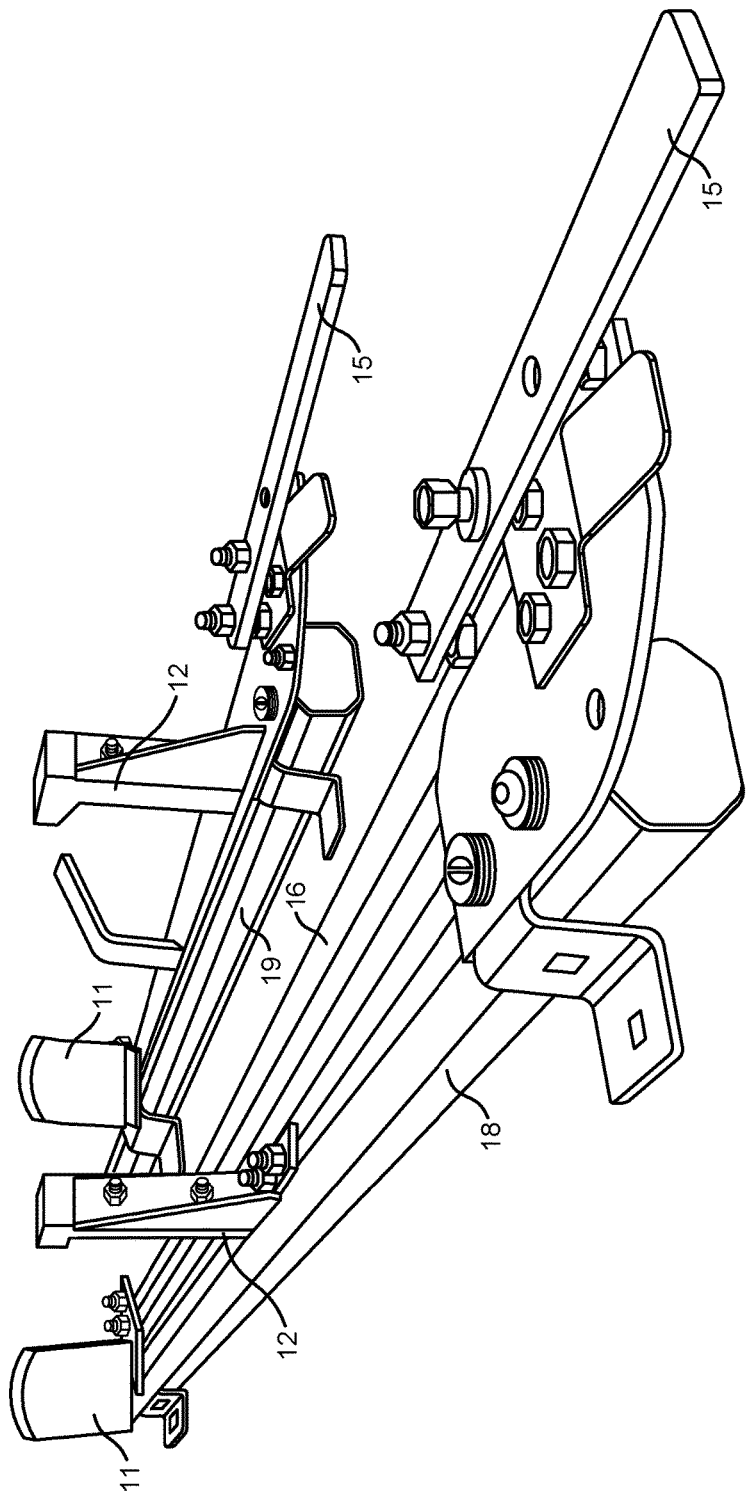
FIG. 3 is another picture illustrating a side ladder rack in a locked position, according to the prior art.
Figure 4:
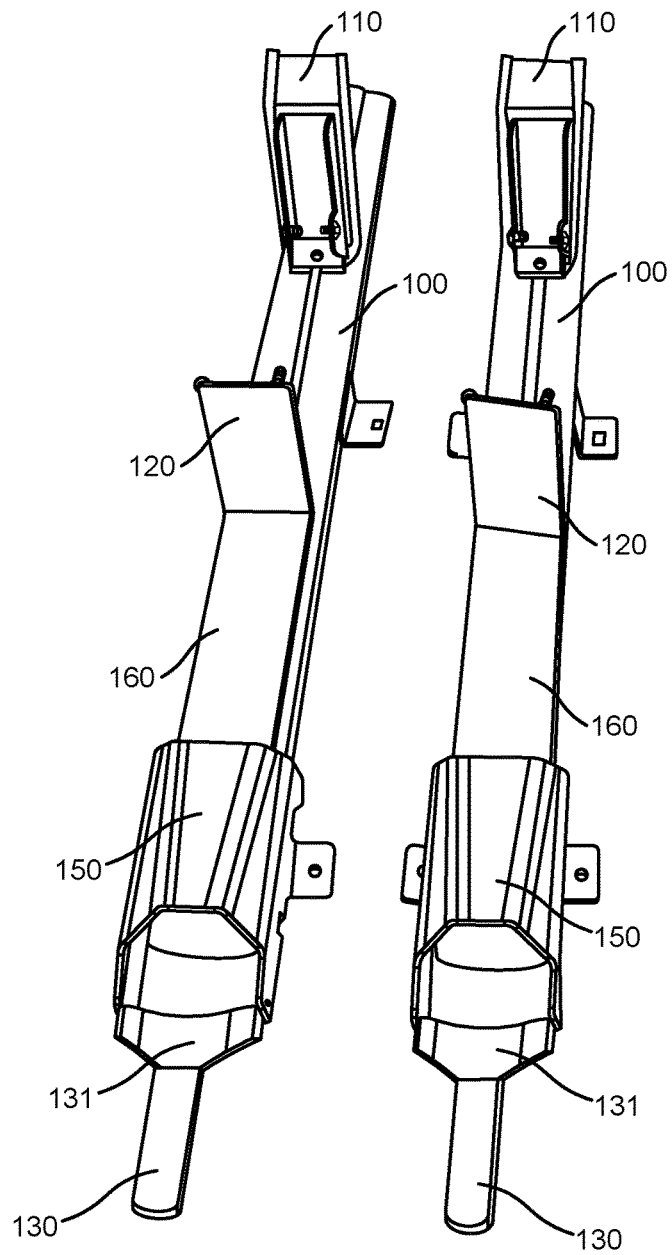
FIG. 4 is a picture illustrating a side ladder rack in a locked position, according to an embodiment.
Figure 5:
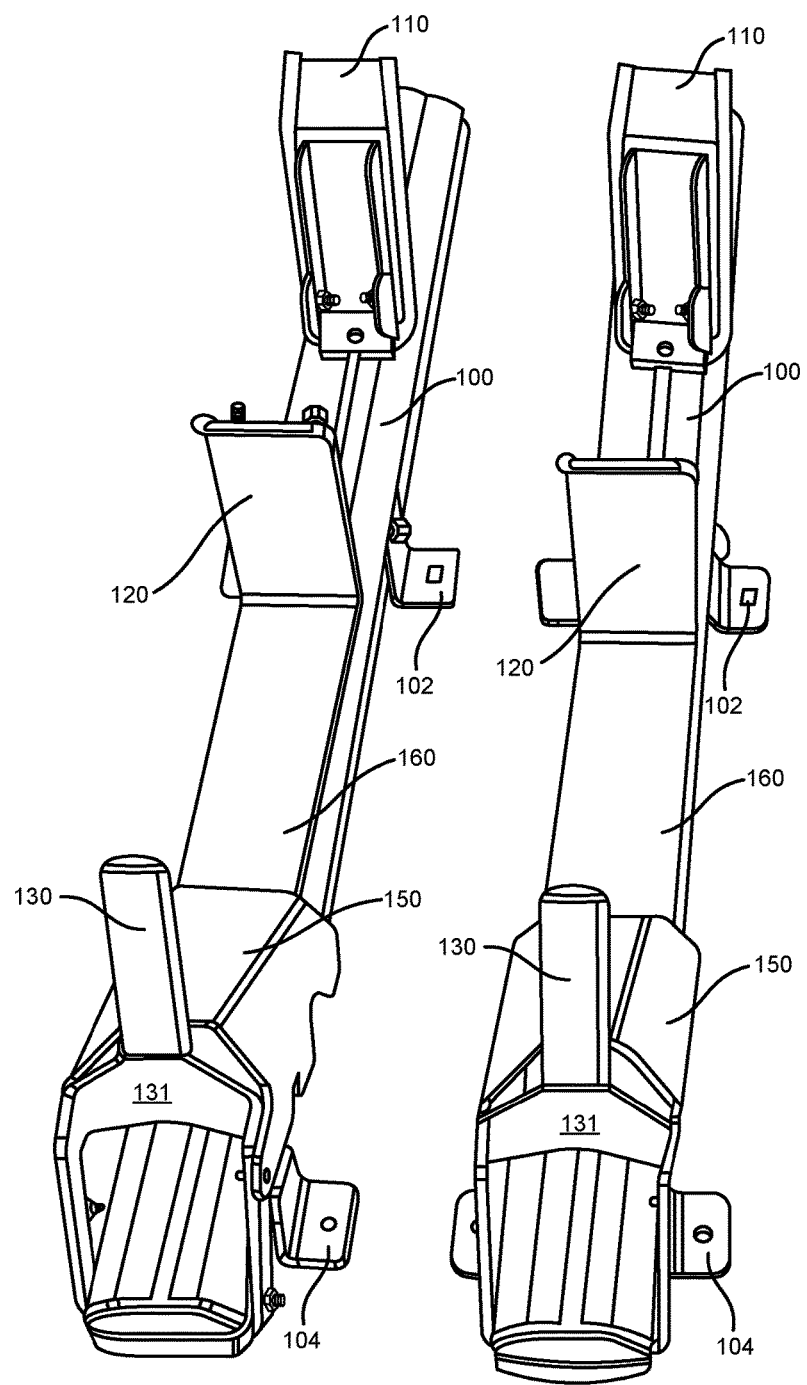
FIG. 5 is a picture illustrating a side ladder rack in an unlocked position, according to an embodiment.
Figure 7:
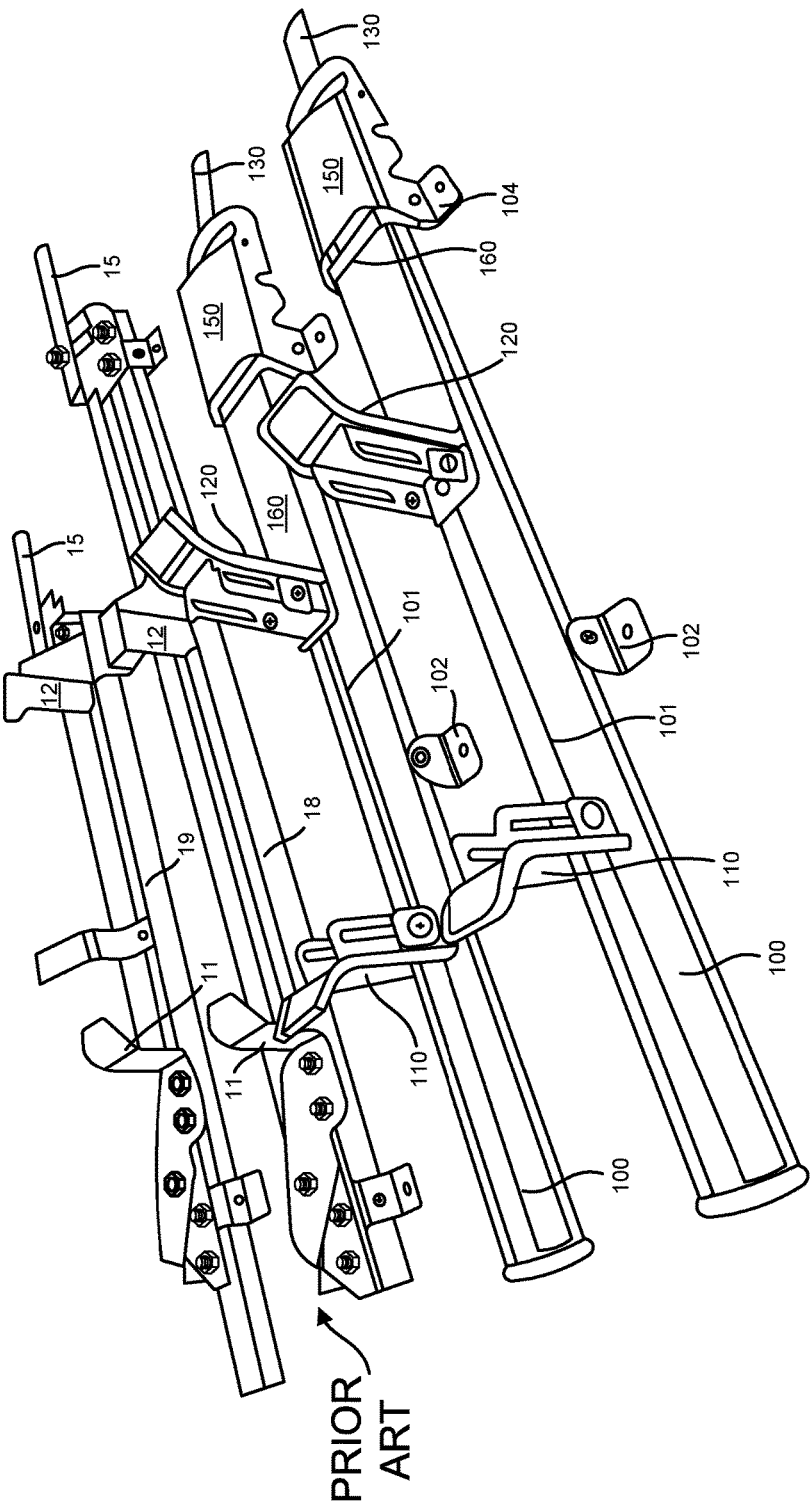
FIG. 7 is a comparative picture illustrating side ladder racks in a locked position, according to the prior art and according to an embodiment.
Figure 8:
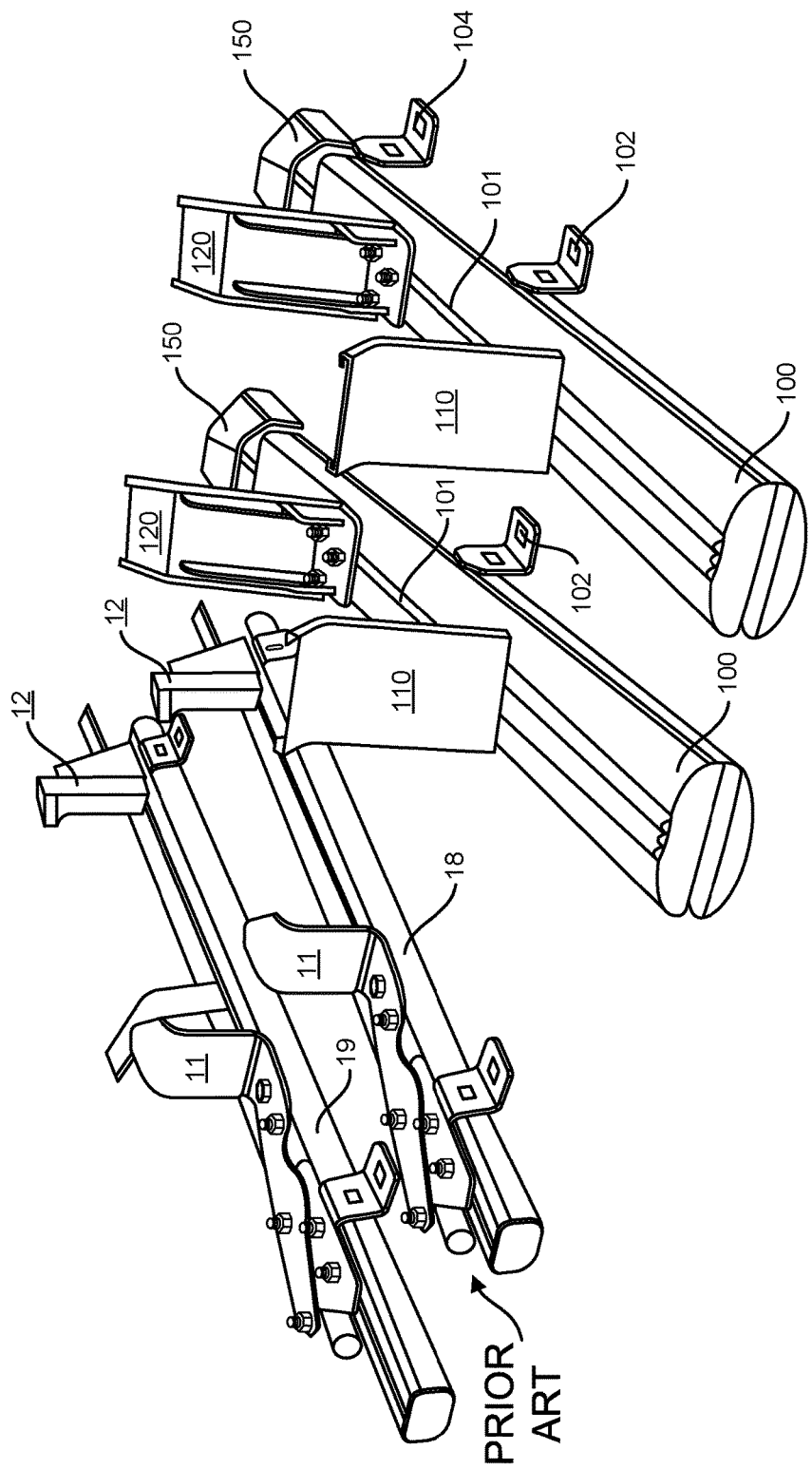
FIG. 8 is another comparative picture illustrating side ladder racks in a locked position, according to the prior art and according to an embodiment.

A prior art rack system is shown in FIGS. 1-3, and further shown in comparative pictures of FIGS. 7-8. There is provided a first arm 18 and a second arm 19, which have a different length in order to clamp a ladder at two different heights, some ladders or step-ladders being wider toward the bottom thereof. Having no choice but to provide two racks of different lengths can be inconvenient since it requires different pieces and processes to manufacture.

The prior art racks comprise a first clamp 11 and a second clamp 12, which clamp the ladder from the outward inwardly. The distance between the first clamp 11 and the second clamp 12 is not readily adjustable. A rod 16 is provided in parallel with the arms 18, 19. A handle 15, actionable by a user, is pivotally connected to both the rod 16 and the arms 18, 19, in order to change the length between the clamps 11, 12 to switch from the locked and unlocked positions. When in the locked position, the handle 15 is maintained in its position by a metallic blade, pin, spring or screw, which provides a rather loose locking of the handle 15. Since the first clamps 11 can rotate on themselves (as seen by comparing FIGS. 1 and 2), weaknesses in the clamping may exist and aggravate the looseness of the clamping.

Figure 13:
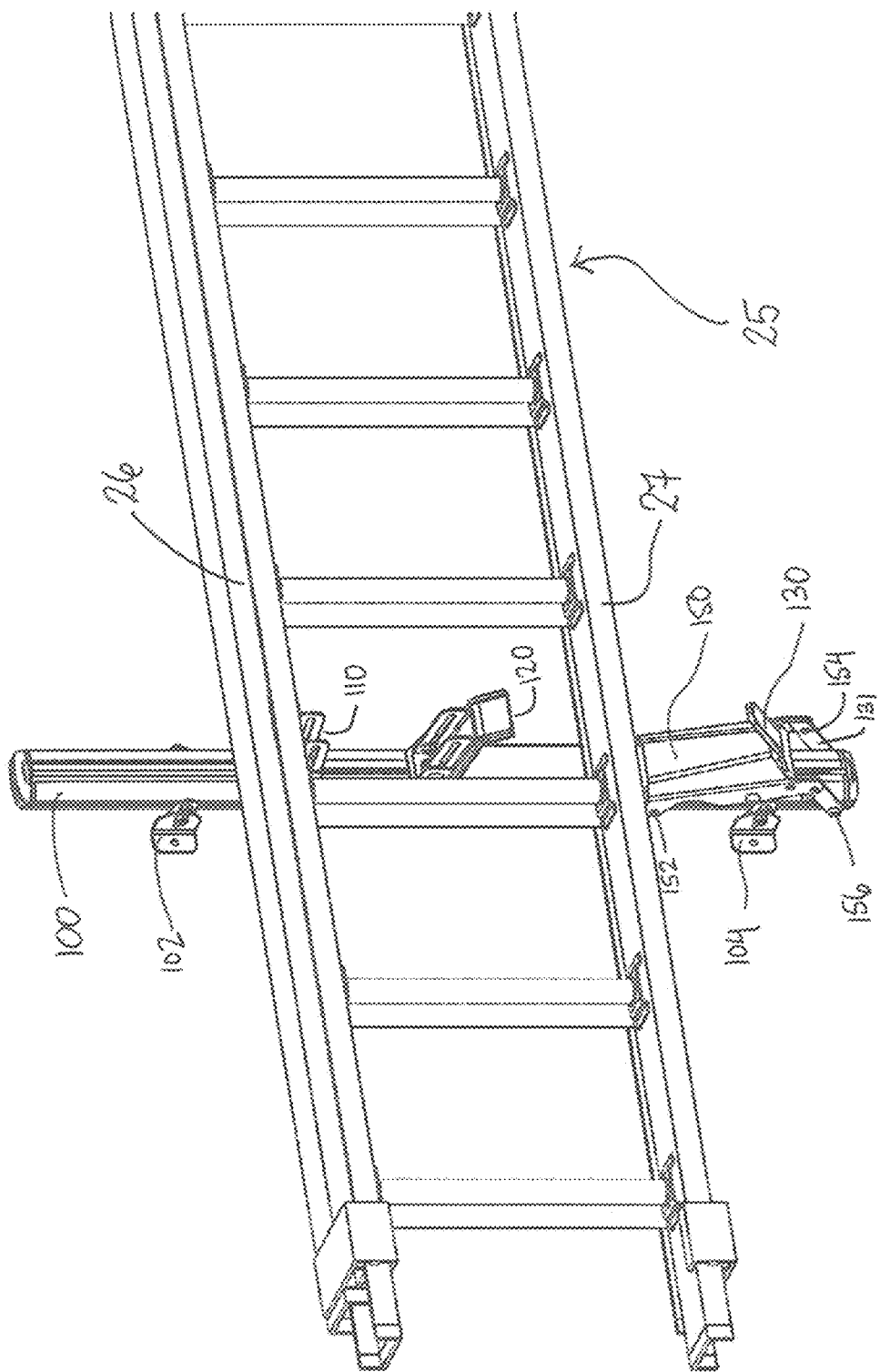
FIG. 13 is a side view illustrating a side ladder rack being used with a ladder in an unlocked position, according to an embodiment.
Figure 14:
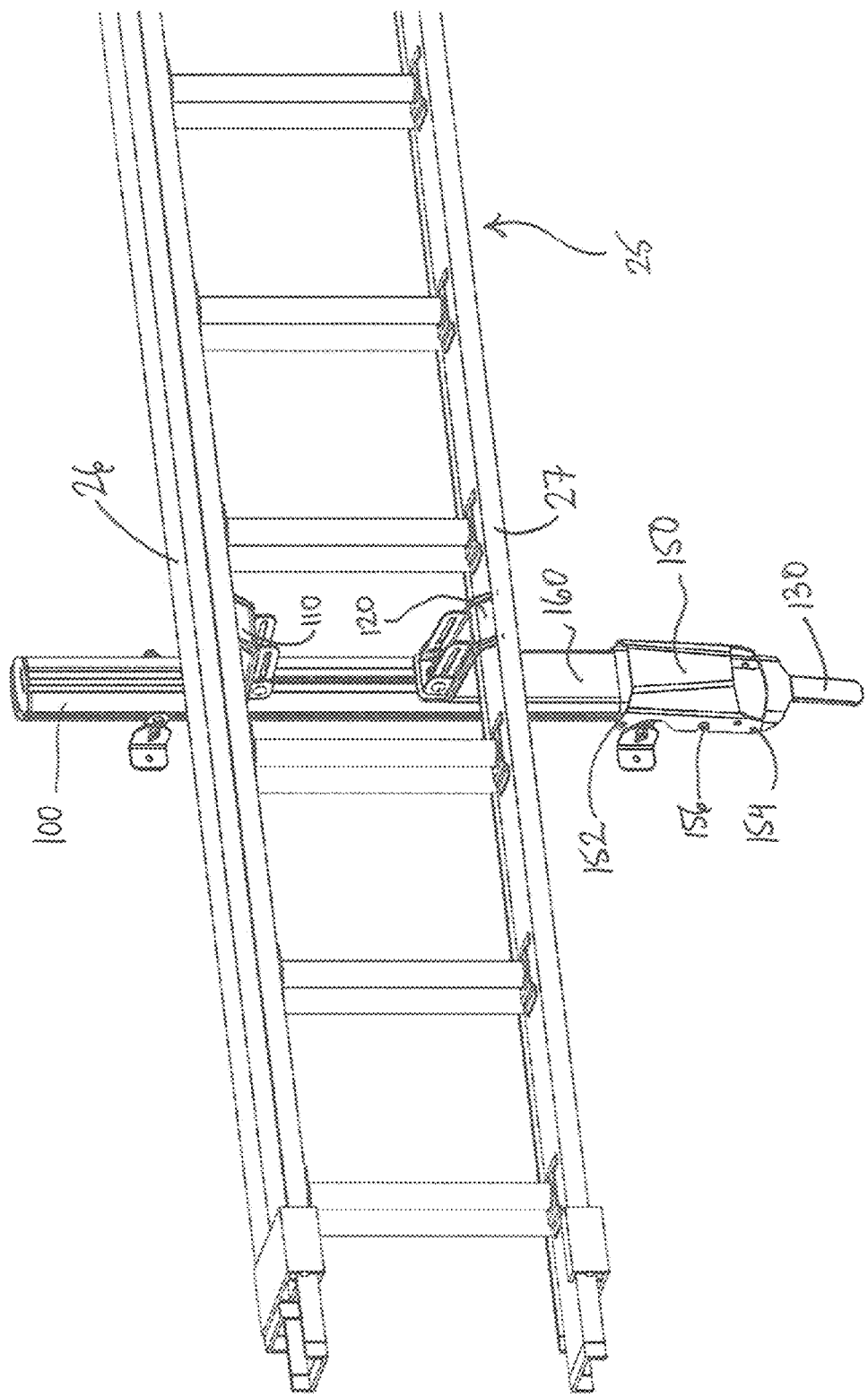
FIG. 14 is a side view illustrating a side ladder rack being used with a ladder in a locked position, according to an embodiment.

In embodiments there are disclosed a rack 100 for holding a ladder (or any other equivalent) thereon. The rack 100 is specifically illustrated in FIGS. 4-6 and 9-14, as well as in the comparative pictures of FIGS. 7-8 (where the rack 100 is shown along with a prior art rack system). The clamps can clamp a ladder from inward outwardly, as seen in FIGS. 13-14.

It should be noted that unlike the prior art rack briefly described above, the rack 100 can be provided as a pair of identical racks 100 for holding both the upper portion and the lower portion of a ladder 25, even though the ladder 25 can be wider towards the bottom thereof (a notable feature of step-ladders, for example). Instead of comprising two racks of different lengths, the pair comprises identical racks 100; only one of them needs to be described since they are advantageously the same. Indeed, the greater adjustability of the length between clamps ensures that a single type of rack can adapt to all reasonable circumstances (i.e., various types of ladders) in which it should be used. It should also be noted that it is always possible to manufacture a pair of racks 100 having different lengths, which can be desirable in some circumstances. Having either identical or different lengths for the two racks in a pair is therefore possible.

The rack 100 is an arm, i.e., a solid piece of material having an elongated shape, having a proximal end and a distal end where a handle 130 is provided. The rack 100 comprises a rail 101 adapted for sliding a complementary device thereon. The rail 101 can be provided on one or two sides of the arm of the rack 100, and/or can be provided on top of the arm of the rack 100. For example, the rail 101 may be made of a longitudinally extending groove or slot, in which a conforming projection can fit, thereby providing the capability of a sliding movement of the projection inside the groove or slot along the longitudinal direction (i.e., the direction along which the arm of the rack 100 extends).

According to an embodiment, connectors 102, 104 are provided to fix the arm of the rack 100 to the side of a vehicle.

A slidable member 160 is shown in FIGS. 9-12. The slidable member substantially covers a part of the arm of the rack 100 and is slidably mounted thereon: it comprises projections that fit inside the rail 101, as described above, to provide slidability. The slidable member 160 is used to change the length between clamps (described further below), and its movement is driven by a user-actionable handle 130 at a distal end of the arm of the rack 100. According to an embodiment, the slidable clamp 120 is fixed on the slidable member 160, which slides on the rail 101.

Clamps 110, 120 are the elements that hold the ladder 25; the first clamp is a fixed clamp 110 while the second clamp is a slidable clamp 120. Clamps have a surface extending substantially perpendicularly from the arm of the rack 100, this surface being adapted to hold the ladder, i.e., the clamps 110, 120 should have a size adapted to clamp the sides 26, 27 of the ladder 25 and may advantageously be provided with a non-skid pad to avoid slipping of the ladder 25 being held by the clamps 110, 120. According to an embodiment, the clamps 110, 120 include an inclined portion at an end thereof (as shown in the figures), inclined toward the ladder 25, to better hold the ladder 25 therein.

The clamps 110, 120 are provided with an attachment 111, 121 (respectively) that project into and fit within the rail 101, as discussed above. The slidable clamp 120 is located closer to the handle than the fixed clamp 110 (i.e., distally from clamp 110).

According to an embodiment, the attachment 111 of the fixed clamp 110 is a fixed attachment (e.g., a screw), that can be fixed or secured to the rail 101 without being able to slide therein. The rail 101 may thus be provided with portions in which a screw or other type of fixed attachment may be definitively fixed to secure the fixed clamp 110 at a definite location on the arm of the rack 100. However, this fixed attachment may be removed on purpose in order to relocate the fixed clamp 110 at another fixed location on the arm of the rack 100.

By contrast, the slidable clamp 120 is not definitively fixed to the arm of the rack 100. In other words, the attachment 121 of the slidable clamp 120 is not fixed to the rail; it slides therein. This allows the slidable clamp 120 to be relocated easily by simply moving it along the rail 101 to locate it at the desired position without any effort or without having to unscrew an attachment (as for the fixed clamp 110). This slidable movement allows for adjustability of the length between both clamps 110, 120. It further allows for the possibility to lock (clamp the ladder 25) or unlock (unclamp the ladder 25) by a sliding movement.

However, if one of the clamps is slidably moveable along a longitudinal axis of the arm of the rack 100, there should be a way to impede any movement of both clamps 110, 120 when the ladder 25 is being held by these clamps 110, 120. A locking/unlocking mechanism that works in conjunction with the slidable clamp 120 will now be described.

The user is expected to use a handle 130 to lock and unlock the clamps 110, 120. The handle is a solid piece of material extending from the rack 100 that can be grabbed by the user and pivoted up and down under a force (torque) exerted by the user.

According to an embodiment, and as shown in FIGS. 4-14, the elongated portion of the handle 130 comprises a Y-shaped portion 131 (i.e., the portion of the handle 130 which connected to the remainder of the arm of the rack 100) that is pivotally connected to a pivoting member 150 that will be described further below. The handle 130 can be made of a metallic material such as stainless steel, and covered by a vinyl sheath or any suitable equivalent for improved gripping by the user.

Figure 6:
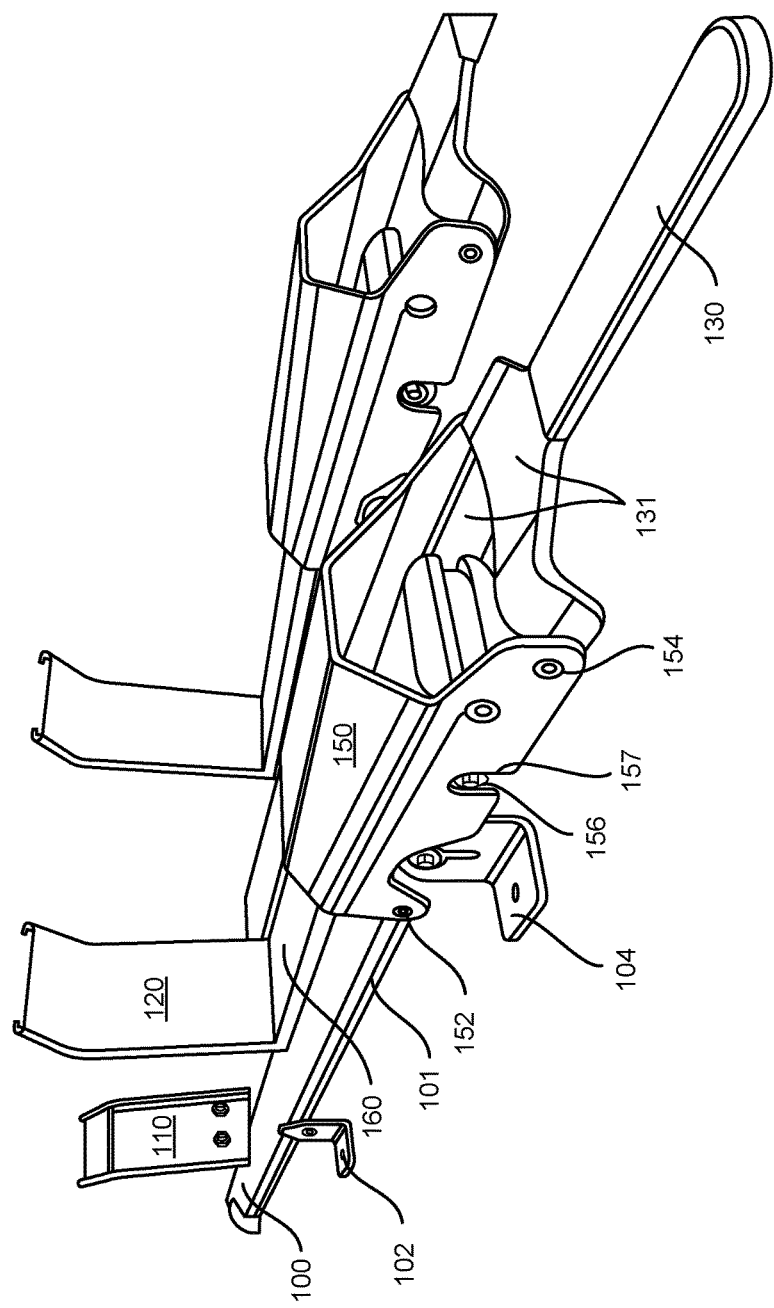
FIG. 6 is another picture illustrating a side ladder rack in a locked position, according to an embodiment.

The pivoting member 150 is a piece of material upon which the user may not act directly. The pivoting member 150, as its name suggests, is pivotable. The pivoting member extends substantially along the arm of the rack 100, and has two pivots, as shown in FIGS. 9-13: a first pivotal connection 152, which pivotally connects the pivoting member 150 to the a sliding member 160 provided on the arm of the rack 100; and a second pivotal connection 154, which pivotally connects the pivoting member 150 to the handle 130, more specifically to its Y-shaped portion 131. The Y-shaped portion 131 of the handle 130 is further pivotally connected to the arm of the rack 100 at the distal end thereof via a pivotal connection 156. (Even though the pivotal connection are referred to in the singular form, they are usually provided in pairs on either sides of the arm of the rack 100, as shown in FIG. 6, hence the Y-shape of the portion 131 extending from the handle 130). The pivotal connections 152, 154, 156 may be provided in the form of a pin, small rod or screw that extends along apertures in the various parts that pivot therearound. According to an embodiment, the pivoting member 150 may comprise an opening 157, which is a groove that allows the pivoting member 150 to pivot close to the pivotal connection 156 without mechanically interfering (i.e., entering in contact) therewith.

Figure 9:
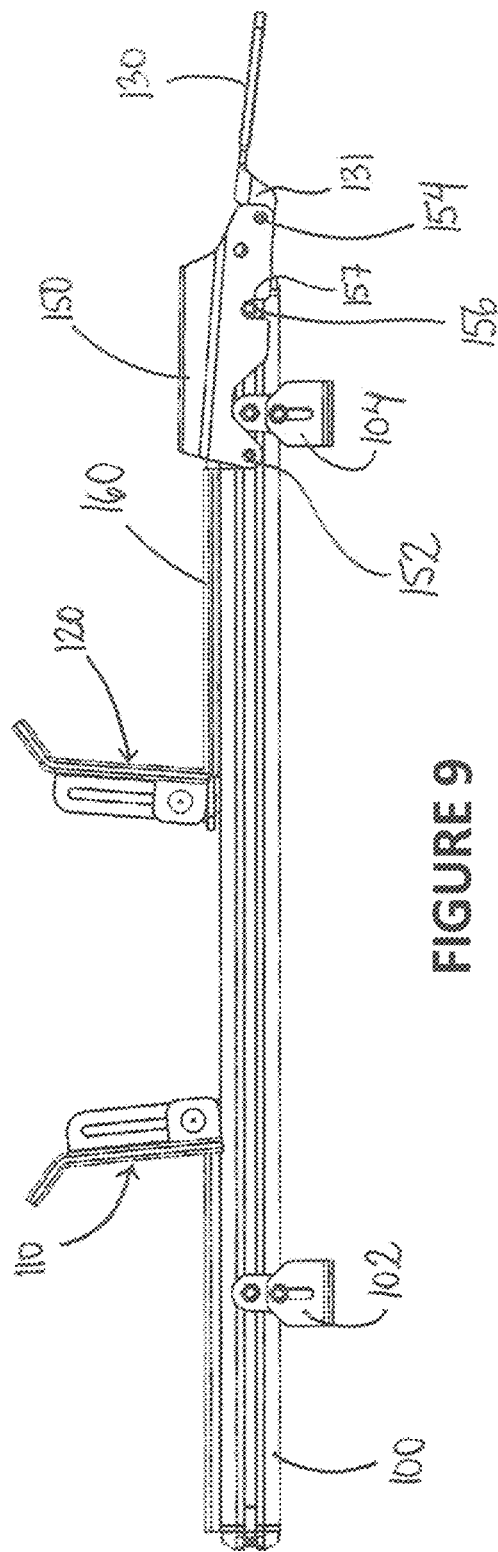
FIG. 9 is a side view illustrating a side ladder rack in a locked position, according to an embodiment.
Figure 10:
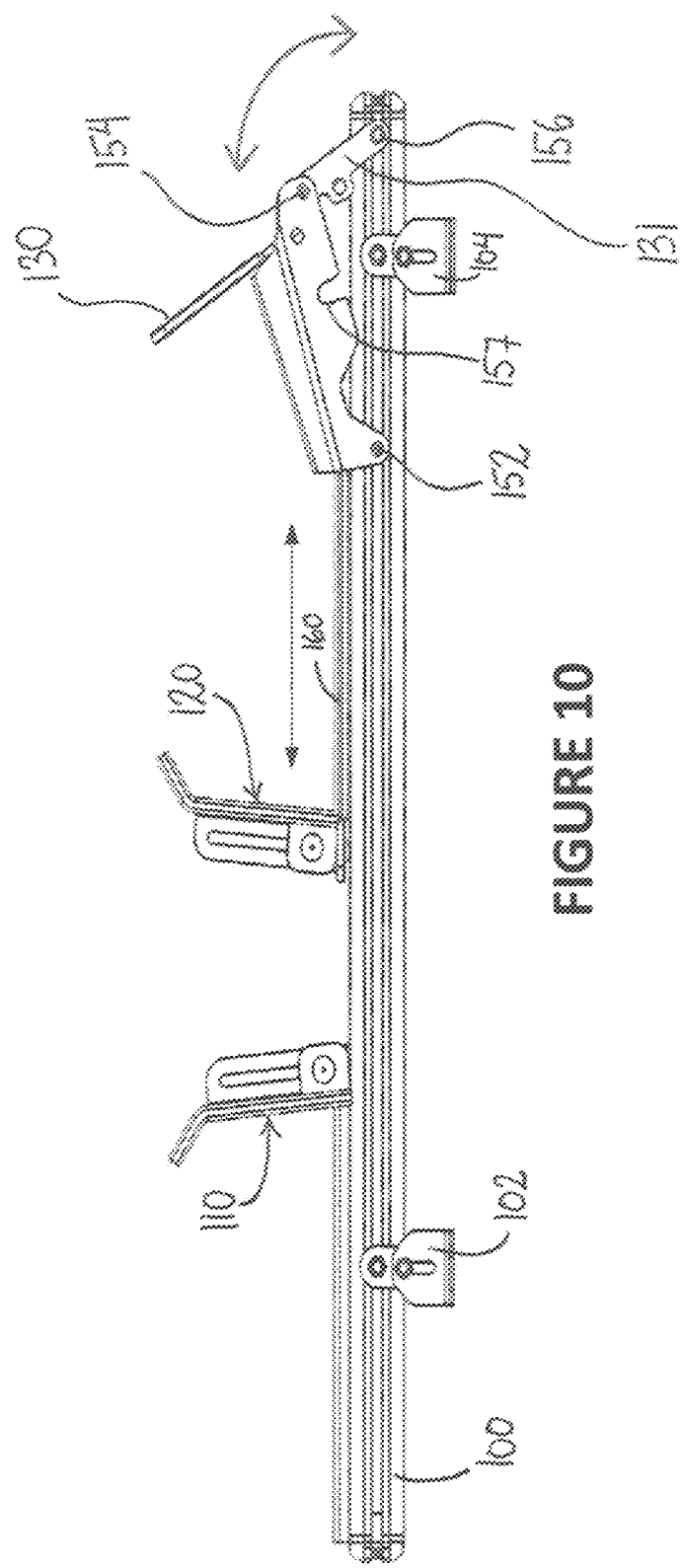
FIG. 10 is a side view illustrating a side ladder rack in an unlocked position, according to an embodiment.
Figure 11:
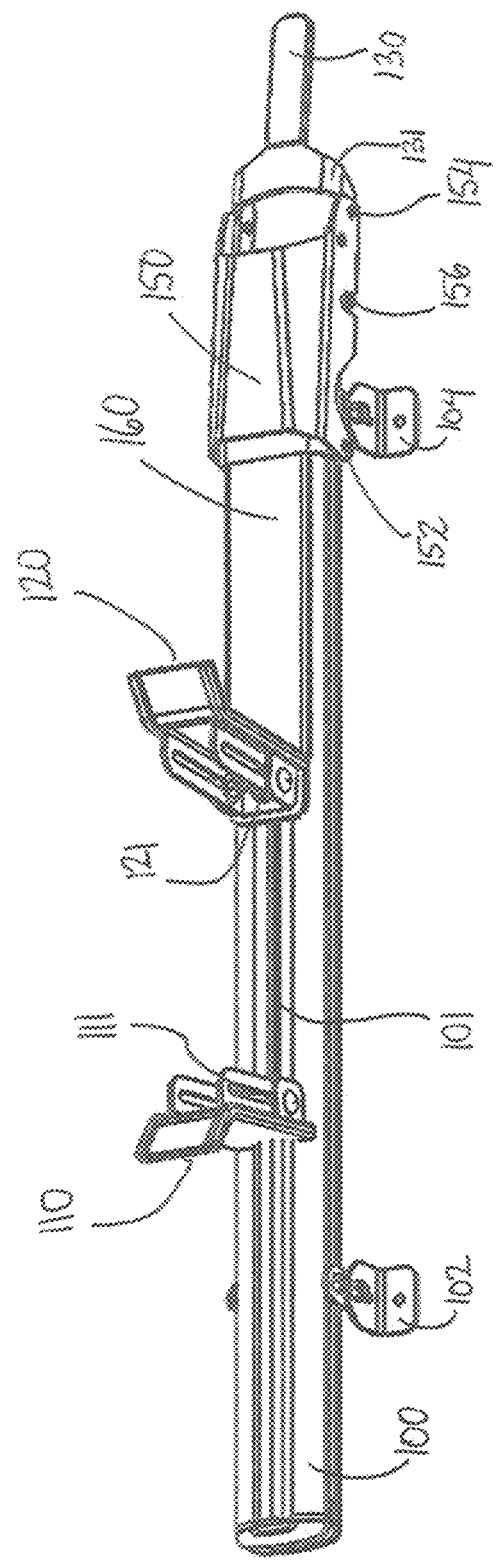
FIG. 11 is a perspective view illustrating a side ladder rack in a locked position, according to an embodiment.
Figure 12:
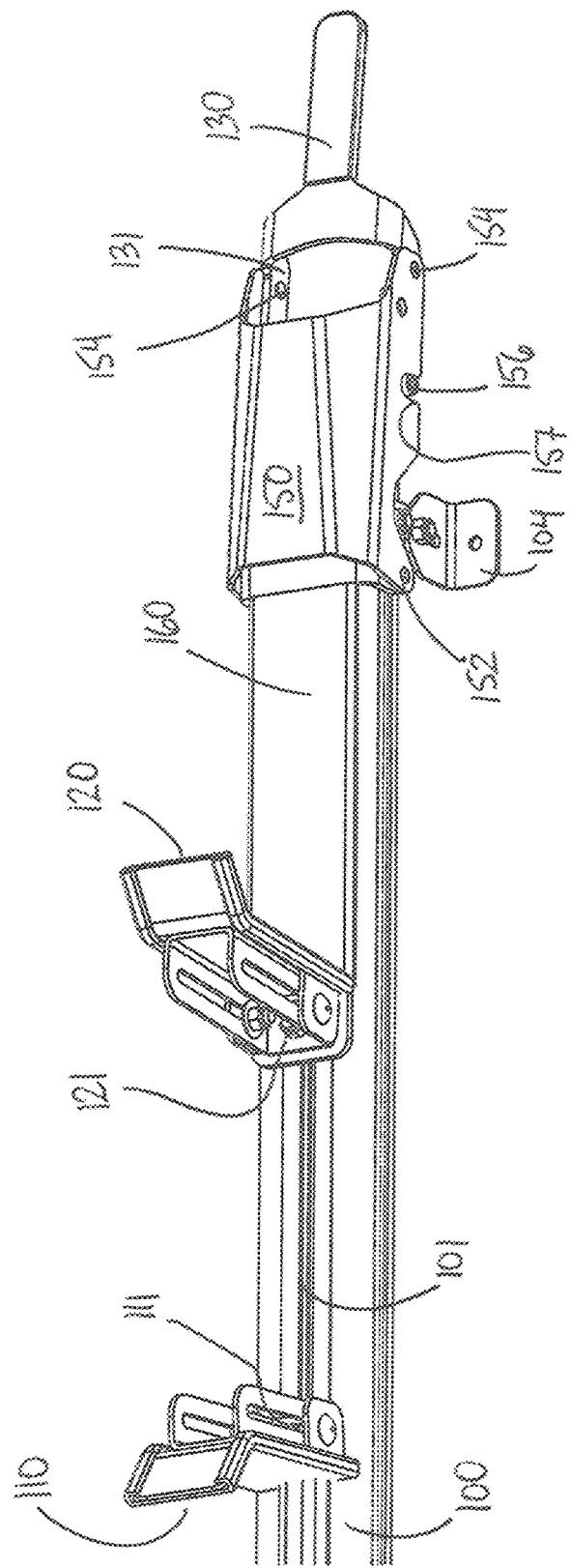
FIG. 12 is another perspective view illustrating a side ladder rack in a locked position, according to an embodiment.

The difference between the locked and unlocked positions is well illustrated in FIGS. 9-10. In FIG. 9, illustrating the locked position, the handle 130 is kept down, and the pivoting member extends along the longitudinally axis of the arm of the rack 100.

Upon exerting a torque on the handle 130 to lift it up, the handle 130 (more specifically, its Y-shaped portion 131) pivots around its pivot 156, as shown in FIG. 10. Since the handle 130 is further pivotally connected to the pivoting member 150 by the second pivotal connection 154, the lifting-up of the handle 130 by the user drives up the distal end of the pivoting member 150 (the end pivotally connected to the handle 130). Moreover, the distal end of the pivoting member 150 is pushed toward the proximal end of the arm of the rack 100. The proximal portion of the pivoting member (the end pivotally connected to the sliding member 160) can rotate around its pivotal connection 152 to partially compensate, but the fact that the pivoting member 150 is pushed toward the proximal end of the arm of the rack 100 implies that the pivotal connection 152 will further transmit a translation force on the sliding member 160 to which it is pivotally connected.

By this movement, the sliding member 160, when the handle 130 is being lifted up, receives a force that drives it in a translation movement toward the proximal end of the arm of the rack 100. Since the sliding member 160 is adapted to slide on the rail 101, it will undergo a sliding movement that will further drive the clamp 120, with which it is solidary, toward the proximal end of the arm of the rack 100. This action reduces the length between both clamps 110, 120. The clamps that were clamping the ladder 25 from the inside are thus not clamping the ladder 25 anymore, since at least one of the clamps 110, 120 does not touch the ladder 25 anymore (as shown in FIG. 13). From a locked position, the rack 100 is brought to an unlocked position, in which the ladder 25 that was being held can be removed and a new ladder 25 can be installed.

Once the ladder 25 to be clamped is in place (i.e., the sides 26, 27 of the ladder 25 are on either sides of the clamps 110, 120), the user can bring down the handle 130 to lock the clamps and bring the rack in its locked position. When the handle 130 is brought down, the distal portion of the pivoting member 150 is brought back down on the arm of the rack 100, and away from the clamp 110. This movement is permitted by a pivotal movement of the pivotal connection 152, which further brings the slidable member 160 away from the clamp 110 (the slidable member 160 moves in translation by sliding on the rail 101 away from the clamp 110). This movement extends or increases the length between the clamps 110, 120 until this length is approximately the same as the width between both sides 26, 27 of the ladder 25 (as shown in FIG. 14). When the distance between the clamps is approximately the same as the width between both sides 26, 27 of the ladder 25, the clamping can be effective. If the clamping surface of the clamps (i.e., the outward surface) comprises a pad made of a resilient material, the capacity of the material to be slightly compressed allows for the length between the clamps 110, 120 to be slightly more than the width between both sides 26, 27 of the ladder 25 without rendering the clamping impossible (in fact, it can be more firmly secured).

The embodiments described above are advantageous in that they are adjustable for all ladder sizes. Indeed, since the locations of the clamps 110, 120 are adjustable on the rack 100, the width therebetween can be adjusted to the desired length to fit within any ladder. The slidability of the slidable clamp 120 and the fact that the fixed clamp 110 can be unscrewed and screwed at a new and more appropriate location mean that any ladder can be effectively clamped.

Moreover, the clamps 110, 120 in the embodiments described above are high enough to be able to clamp ladders of any thickness. For example, double or triple ladders can be secured by the clamps. Stepladders can also be secured by the clamps even though they can have more irregular shapes.

Furthermore, as noted above with respect to prior art rack systems, ladder racks are conventionally asymmetrical: the first and second racks do not have the same length, as illustrated in FIGS. 1-3. However, in the embodiments described above, both the first and second racks can have the same length; they can be identical. In this case, manufacture, use and maintenance of these rack systems are thereby facilitated. Providing different lengths for the pair of arms of racks 100 is also possible, which implies more choice and flexibility in the possibilities of operation. A rack system comprising only one arm of rack 100 (instead of a pair thereof) is also possible.

It should be noted that the handle 130, when positioned in the locked position, ensures a proper locking of the clamps 110, 120 (auto locking). In prior art rack systems, the auto locking is usually provided by a metallic blade, a spring or a screw, which can become loose, in which case the auto locking capability is lost. This inconvenience in prior art systems is emphasized by the fact that the rotation of the clamps (as seen by comparing first clamps 11 in FIGS. 1 and 2) can cause looseness in the clamping (i.e., a spacing may be created between the clamps and the ladder due to the rotation). This looseness causes the ladder not to be secured properly. Since the clamps of the embodiments described above are not rotatable, and since the locking is not provided by a metallic blade or pin, this inconvenience does not arise.

Finally, no strap needs to be provided to further secure the ladder in the clamps, as in the prior art; the ladder should be sufficiently secured. However, the embodiments described herein can be advantageously complemented by a padlock to prevent withdrawal of the ladder by an inappropriate person.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A ladder rack for holding a ladder, the ladder rack comprising:
    an arm extending longitudinally from a proximal end to a distal end;
    a slidable member which is slidably mounted on the arm;
    a first clamp fixed to the arm;
    a second clamp fixed to the slidable member at a distance from the first clamp;
    a handle pivotally connected to the distal end of the arm;
    a pivoting member pivotally connected on one end to the handle and on another end to the slidable member;
    whereby upon pivoting the handle upwardly, the pivoting member is forced to pivot at both ends thereof and to push on the slidable member, which translates toward the proximal end, reducing the distance between the first clamp and the second clamp.

2. The ladder rack of claim 1, wherein the first clamp and the second clamp are adapted to clamp the ladder from inward outwardly.

3. The ladder rack of claim 1, wherein the ladder rack is provided as a pair of identical ladder racks for holding the ladder.

4. The ladder rack of claim 1, wherein the ladder rack is for installation on one of: an outer side of a vehicle, an inner side of the vehicle, an inner rear of the vehicle, an outer rear of the vehicle, and an inner roof of a vehicle.

* * * * *